Figure 1:
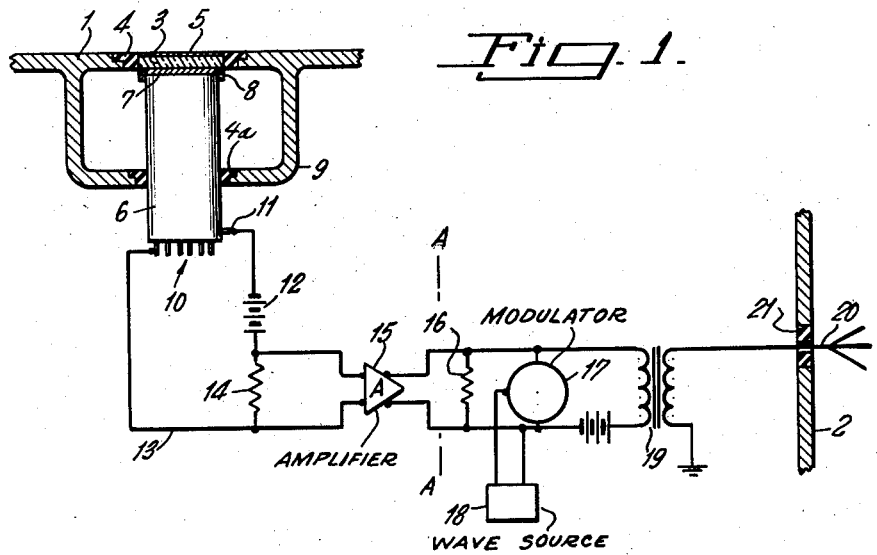

Dec. 1, 1964   I. W. RUDERMAN   3,159,029
DETECTION OF MICROMETEORITES AND SIMILAR BODIES
Filed May 23, 1960

INVENTOR.
I. WARREN RUDERMAN
BY
J. W. Schmied
ATTORNEY

3,159,029
DETECTION OF MICROMETEORITES AND SIMILAR BODIES

Irving Warren Ruderman, Demarest, N.J., assignor to Isomet Corporation, Palisades Park, N.J., a corporation of New Jersey
Filed May 23, 1960, Ser. No. 31,174
6 Claims. (Cl. 73—170)

This invention relates to apparatus for and methods of detecting, counting and measuring the number, energy, or relative energy of moving bodies more especially meteorites or other bodies of similar nature and size or velocity; it has particular application to detection of micrometeorites moving in the space being traversed by a missile, space craft or aircraft.

Proposals have been made to detect micrometeorites or other bodies in space by various means such as silica plates and piezo-electric bodies. Such devices are relatively insensitive and involve other difficulties and insufficiencies; to effect increases in sensitivity and accuracy and to simplify and improve the apparatus are objects of the present invention.

To accomplish the foregoing and other purposes use is made of the triboluminescence of certain crystals, examples of which are alkali halides activated with heavy metal constituents; as a particular example, cesium iodide activated with such small additions of thallium, tin or other heavy metals.

Although triboluminescence as a phenomenon has long been known, few, if any, practical or useful applications of it have been made. Triboluminescence is a general term used to denote the production of light due to the mechanical excitation of various (usually crystalline) materials. Triboluminescence has been observed in many diverse crystals, all however have been either crystalline powders or very small crystals. The rise time of the observed light emission has also been long.

I have discovered that single crystals of alkali halides containing a small percentage (0.1–0.5%) of a heavy metal ion produce a very strong triboluminescent effect. The significance of this discovery is that large single crystals of high purity and known activator concentration of various alkali halides can be grown, and that the fluorescent emission peaks in a spectral region where it can readily be detected and analyzed.

According to the present disclosure this spectral radiation is applied to a light sensitive element such as a photomultiplier tube to create impulses which may be transmitted to an indicator or employed to control the transmission of pulses or waves of suitable nature via a radio or other transmission system appropriate to the circumstances. For example, in a missile, satellite or other body traveling in space or in the atmosphere the light pulses may control the emission or modulation of amplitude, frequency, phase or coding of a radio transmitter for sending the emitted or modified energy to a ground station or other station for reception. However, it is within the scope of the invention to cause indication or recording within or at the missile, satellite or other body by known means for immediate observation or photographing or for reproduction at a later time.

For example, by amplitude modulation of a suitably high frequency carrier wave or by controlling the emission of code groups of pulses by the well known pulse-code transmission method the number as well as the amplitude of micrometeorites may be transmitted. Apparatus for performing these functions under the control of the several amplitudes of pulses are well within the range of skill of those familiar with the radio transmission art.

From the foregoing, therefore, it may be seen that the objects of the invention are the counting or measurement of the energies of particles or bodies such as meteorites having a motion relative to the location at which they are to be measured or counted and the recording or transmission to another place of information representing the counts or measurements thus made.

Figure 2:
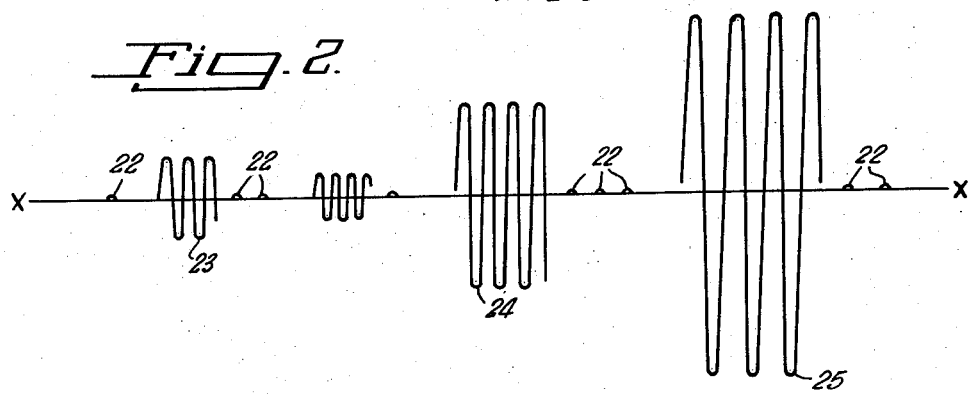
Figure 3:
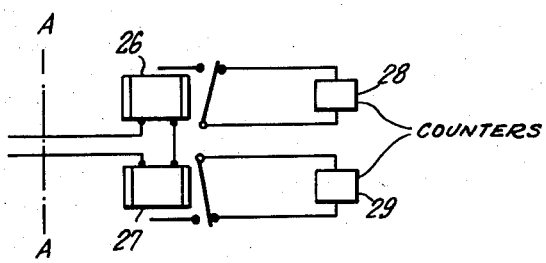

An exemplary apparatus used in carrying out the objects heretofore outlined will be described in connection with the accompanying drawings, in which:

FIGURE 1 illustrates cross sections of the walls of a space craft or aircraft cabins with diagrammatic representations of a triboluminescent crystal mounted therein, a radiating antenna extending therefrom and associated apparatus exemplary of the invention connected therebetween;

FIGURE 2 comprises diagrams illustrating light pulses produced by the triboluminescent crystal and resultant waves radiated from an antenna; and FIGURE 3 represents a modification of the apparatus to the right of the line A—A of FIGURE 1.

These drawings are exemplary and are largely diagrammatic, especially with respect to details of mechanical construction, mounting, wave amplification and transmission etc. which details are known to those skilled in the art.

In the drawings are represented two portions 1 and 2 of the outer skin or casing of a device such as a satellite, missile, or space vessel.

A suitable triboluminescent crystal 3, for example, cesium iodide activated with a small amount of thallium, is mounted within this wall in a suitable opening by means of a gasket 4 of any suitable nature such as synthetic rubber, polyethylene, or a vitreous ring in which the crystal is cemented around its outer periphery. The surface of the crystal 3 may and should be covered with a suitably thin light excluding layer 5 of aluminum or any other suitable metal or substance which may be applied by sputtering or may comprise an adherent layer. Under certain conditions a heat and erosion resistant layer 5 may be required. This layer excludes light but may transmit motional energy of micrometeorites to the crystal. Such exciting particles as neutrons, alpha, beta, or gamma waves may penetrate the layer 5 and excite the crystal. Herein lies one of the features of the present invention in that the scintillations resulting from such causes are lesser in the order of one one-millionth than the light flashes resulting from triboluminescence due to mechanical impact of masses of large kinetic energy compared to the energy of nuclear particles. Hence, with properly responsive and suitably adjusted output devices connected to the photomultiplier tube about to be described these pulses of light will either cause none or only negligible response and may be readily distinguished from the desired triboluminescence which is to be recorded, measured, or indicated.

The crystal 3 may be mounted upon the face of a photomultiplier tube 6. Between the two may be a layer 7 of high viscosity silicone or other suitable coupling medium sealed in by a ring 8 of a firmly adhering cement of known type. The tube 6 may be mounted and supported firmly and sealed by a seal 4a in an opening in an approximately toroidal bracket 9 which may be constructed also in such manner as also to improve the air-tightness between the inside and outside of the vessel whose walls 1 are indicated. The foregoing elements are indicated in cross-section except the tube 6 which is conventionally indicated. Among the output electrodes 10 of the tube 6 is the output electrode 11 which is connected to suitable energy sources.

The output path or circuit may be coupled by a coupling element 14 to the input of a suitable amplifier 15 (conventionally indicated). This amplifier may consist of thermionic tubes or transistors associated with suitable batteries or equivalent sources of electric current to amplify the input impulses in one or several stages. The output of the amplifier is impressed through a coupling element 16 onto the input of any suitable modulator 17, conventionally illustrated, for example, a thermionic four-element tube but which in practice may consist of almost any modulating device capable of performing the desired function at sufficiently high frequencies. A source 18 of waves to be modulated is also coupled to the input of the modulator.

The modulated output waves may be impressed through a coupling element 19, indicated as a transformer, onto a radiating structure 20. The conductive path to the radiating structure may be extended through a sealing element 21 to form an airtight seal if desired or needed.

In operation any moving object such as a micrometeorite, grain of dust or other object having a high velocity relative to the crystal 3 strikes the surface shielding of the crystal and communicates a mechanical shock to the crystal. This causes it to triboluminesce. In order to conserve energy the source 18 and the modulator 17 may be so relatively adjusted that no power flows to the antenna structure 20. A flash of light due to triboluminescence may be considered to have a duration of about one-millionth of a second. For satisfactory results the source 18 should have a frequency well above one million cycles per second.

In FIGURE 2 the base line X—X represents the dark condition of the crystal 3. The small pips 22 indicate the current from the output of the amplifier 15 due to light flashes which might be due to nuclear particles or waves such as mesons, gamma rays, etc. penetrating the crystal 3. The intensity of the resultant flashes is too small to have a significant effect upon the output current of the modulator.

However, material particles creating triboluminescence cause much more intense flashes, as indicated at 23, 24, 25. The intensity in general is proportional to the kinetic energy of the particle relative to the crystal so that mechanical objects of large kinetic energy may be distinguished from those of small energy.

The flashes due to micrometeorites cause large pulses of current in the coupling element 14 and this causes the amplifier to deliver large pulse voltages to the coupling element 16, whereby the modulator is transiently heavily biased in such sense as to cause it to deliver pulses, as 23, 24, 25 of wave energy to the radiating system 20. These pulses of current may be received and monitored or interpreted at any ground station, or at receiving apparatus on any other body which is within range. Whereas the pulses 23, 24, 25 are indicated as of progressively increasing amplitude they will in general vary in amplitude at random; also, the amplitude of each pulse may rise or decay in amplitude linearly, exponentially, or otherwise. It is sufficient for the purpose of the present invention if the total energy of each electrical pulse varies very roughly as a function of the impulse of kinetic energy which causes the electrical pulse to occur.

Thus, the electrical pulses, and, consequently, the micrometeorites, or other analogous disturbing bodies, may be counted. By a suitable amplitude discriminating receiver large pulses may be counted or otherwise distinguished from small ones. If the pulses are not too frequent and a sufficiently powerful amplifier is available a rough count and discrimination could be made by means of the ear and a telephone receiver. However, amplitude discriminating receivers and counting or other suitable types of recording devices are known.

Transmission of the information to a distance is a supplemental feature. It is contemplated that the information may be recorded within the missile or satellite for later recovery of the record or remote control of transmission at a later time. Furthermore, remote control devices are known whereby the power may be turned off or maintained off the tube 6, amplifier 15, and transmitter-modulator 17–18 for greater or longer periods of time in order to conserve their energies for longer life.

Use of a crystal of activated cesium iodide is exemplary. Many other triboluminescent crystals may be used such as lithium, sodium, potassium, and cesium halides unactivated or activated with heavy metals such as thallium are examples. In general, use of any crystal or transparent body known or ascertainable by test to be triboluminescent and having substantial ability to withstand shocks without destruction or serious impairment may be used.

As a simple counter the apparatus to the right of line A—A in FIGURE 3 may be substituted for that to the right of line A—A in FIGURE 1.

In FIGURE 3 the output circuit of the amplifier is connected through the operating windings of a pair of sensitive relays 26 and 27 of which relay 27 may be more sensitive than relay 26. Relay 27 therefore counts more pulses than relay 26 and therefore a discriminative counting of total pulses and large pulses may be had.

Counter 29 would therefore count all pulses whereas counter 28 counts only the larger ones. These relays and counters are conventional representations of amplitude selective counters; in practice trigger discharge tubes or other devices of increased speed and sensitivity as well as more ready adjustability may be used. Also they typify a series of devices for selecting more than two groups of counts if desired.

For present purposes "light" is radiation in or near the visible range and a triboluminescent crystal or phosphor is "transparent" if it is transparent to its self produced light radiation.

According to this specification and the appended claims micro-bodies and physical bodies are physical entities comprising multi-molecular aggregates as distinguished from molecules or ions.

For the purposes of this specification a space craft is any aeroplane, missile, satellite, or other similar craft or true space craft.

What is claimed is:

1. In combination with an outer wall of a space craft, a triboluminescent body mounted on said wall, a metal layer in contact with the surface of said body on the exterior of said wall, said layer transmitting the kinetic energy of micro-bodies striking said layer to said triboluminescent body.

2. A combination according to claim 1, including a photo-electric means optically coupled to said body for the production of electric current under control of and varying in amplitude according to the intensity of light transferred from said body to said photoelectric means, and counting means actuated by said current.

3. In combination with a wall of a space craft adapted to exposure to the external environment of said craft, the combination of a triboluminescent body mounted in said wall, a heat and erosion resistant layer of material in physical energy conveying relationship with said body on the exterior surface of said wall whereby bodies striking said layer convey the kinetic energy due to deceleration of said bodies to said triboluminescent body.

4. A combination according to claim 3, including a photo-electric means optically coupled to said body for the production of electric current under control of and varying in amplitude according to the intensity of light transferred from said body, a transmitter of high frequency waves, and control means to cause said transmitter to transmit wave energy according to the amplitude of said current.

5. A micrometeorite detector, comprising a triboluminescent body, a protective layer superposed on said body and interposed in a path between the trajectories of micrometeorites and said body, said layer conveying the kinetic energies of said micrometeorites to said triboluminescent body.

6. The combination according to claim 5 wherein is further provided photo-electric means, means optically coupling said photo-electric means to said body, and means for counting pulses of signal produced by said photo-electric means on impact of micrometeorites against said layer.

References Cited by the Examiner
UNITED STATES PATENTS

| | | | |
|---|---|---|---|
| 2,585,551 | 2/52 | Hofstadter | 252—301.4 |
| 2,719,127 | 9/55 | Schenck | 252—301.4 |
| 2,877,452 | 3/59 | Astin | 340—190 |
| 2,892,950 | 6/59 | Sadowsky | 340—190 |
| 2,934,287 | 4/60 | Ault | 340—190 |
| 2,944,146 | 7/60 | Schultz | 340—190 |

NEIL C. READ, *Primary Examiner.*

L. MILLER ANDRUS, THOMAS B. HABECKER,
*Examiners.*